(12) United States Patent
Vaudenay et al.

(10) Patent No.: US 7,512,241 B2
(45) Date of Patent: Mar. 31, 2009

(54) METHOD FOR GENERATING PSEUDO-RANDOM KEYS

(75) Inventors: Serge Vaudenay, Crissier (CH); Pascal Junod, Lausanne (CH)

(73) Assignee: Nagravision SA, Cheseaux-sur-Lausanne (CH)

( * ) Notice: Subject to any disclaimer, the term of this patent is extended or adjusted under 35 U.S.C. 154(b) by 614 days.

(21) Appl. No.: 10/915,421

(22) Filed: Aug. 11, 2004

(65) Prior Publication Data
US 2005/0053233 A1 Mar. 10, 2005

(30) Foreign Application Priority Data
Sep. 5, 2003 (EP) ................... 03103307

(51) Int. Cl.
*H04L 9/00* (2006.01)
(52) U.S. Cl. ................. 380/277; 380/46; 380/44
(58) Field of Classification Search ............. 380/44–47, 380/277–286
See application file for complete search history.

(56) References Cited

U.S. PATENT DOCUMENTS

| | | | |
|---|---|---|---|
| 5,404,402 A * | 4/1995 | Sprunk ................. | 713/189 |
| 5,745,577 A | 4/1998 | Leech | |
| 6,189,095 B1 * | 2/2001 | Coppersmith et al. ....... | 713/150 |
| 6,804,355 B1 * | 10/2004 | Graunke ................ | 380/37 |
| 7,039,184 B2 * | 5/2006 | Sano et al. ............. | 380/42 |
| 7,162,031 B1 * | 1/2007 | Roelofsen et al. ......... | 380/28 |
| 2002/0044651 A1 | 4/2002 | Tuvell | |
| 2002/0118827 A1 * | 8/2002 | Luyster ................ | 380/37 |
| 2003/0195915 A1 * | 10/2003 | Aoki et al. ............. | 708/650 |
| 2003/0223580 A1 * | 12/2003 | Snell .................. | 380/28 |
| 2003/0236803 A1 * | 12/2003 | Williams .............. | 708/252 |

FOREIGN PATENT DOCUMENTS

EP 1 119 130 A 7/2001

OTHER PUBLICATIONS

Applied Cryptography, Second Edition: protocols, algorithms, and source code in C Bruce Schneier ISBN 0-471-12845-7 Copyright 1996.*

(Continued)

*Primary Examiner*—Nasser G Moazzami
*Assistant Examiner*—Rebecca L Pachura
(74) *Attorney, Agent, or Firm*—Harness, Dickey & Pierce

(57) ABSTRACT

Provided is a method to generate sub-keys based on a main key in a case in which, each sub-key gives no information to recover the main key. The method has the steps of obtaining a first value by applying to the main key a linear diversification by mixing the main key with a constant and applying to the first value a non-linear transformation. The non-linear transformation includes obtaining a second value by applying the first value to a substitution layer, obtaining a third value formed of N blocks of the same size by using a diffusion box of multi-permutation type based on the second value, obtaining the fourth value formed by blocks, obtaining the fifth value by applying to the fourth value a substitution layer, obtaining the sub-key by applying to the fifth value a symmetrical encryption module. The first value serves as the key input for this method.

6 Claims, 5 Drawing Sheets

OTHER PUBLICATIONS

Twofish: A 128-Bit Block Cipher B. Schneier, J. Kelsey, D. Whiting, D. Wagner, C. Hall, N. Ferguson Jun. 15, 1998.*

Shannon, Claude. "Communication Theory of Secrecy Systems", Bell System Technical Journal, vol. 28(4), p. 656-715, Oct. 1949.*

Federal Information Processing Standards Publication, U.S. Dept. of Commerce, Washington, DC, US, "Announcing the advanced encryption standard (AES)", Nov. 26, 2001, pp. 1-47.

* cited by examiner

METHOD FOR GENERATING PSEUDO-RANDOM KEYS

FIELD OF THE INVENTION

The present invention refers to a method for generating a cryptographically secure pseudo-random sequence based on a first seed or key.

BACKGROUND ART

In many occasions it is necessary to generate a sequence of data which are dependent on a basic key. A first field of application is to generate challenges which are identification numbers generated every ten seconds e.g. and requested in addition to a pin code. This number is only valid during a short time and avoids any replay from a third party. Such generator aims to replace the old strikethrough lists which were printed and sent to the user for the purpose of identification.

Another field of application is the generation of sub-keys in an encryption algorithm which uses multiple rounds. A first key should be then expanded to produce a lot of sub-keys, each of same being applied to one round. An example of such multiple rounds encryption method is described in the document U.S. Pat. No. 5,214,703.

We expect two characteristics of such a generation method, i.e. the non predictability of any of the other sequence (or the seed) while knowing one sequence and the reproduction of the sequence in either direction. This last characteristic is specifically used when the sequence is used as encryption sub-key since the decryption needs to use the sub-keys in reverse order.

A common solution is to apply the seed or the main key to a LFSR (Linear Feedback Shift Register). LFSR generators produce what are called linear recursive sequences (LRS) because all operations are linear. Generally speaking, the length of the sequence, before repetition occurs, depends upon two things, the feedback taps and the initial state. An LFSR of any given size m (number of registers) is capable of producing every possible state during the period $N=2^m-1$, but will do so only if proper feedback taps, or terms, have been chosen. Such a sequence is called a maximal length sequence, maximal sequence, or less commonly, maximum length sequence.

Known methods use the output of such shift register to generate the sub-keys block by block to feed the rounds of the encryption process.

It is generally accepted that knowing one sequence generated that way opens the possibility to access to the other sequences or the seed.

SUMMARY OF THE INVENTION

The aim of this invention is to propose a method to generate sequences or sub-keys based on a main key, in which each sub-key gives no information to recover the main key or any other sub-keys.

The aim is achieved with a method to generate sub-keys based on a main key (MKEY), comprising the following steps:
  obtaining a first value (A1) by applying on the main key (MKEY) a linear diversification layer by mixing the main key (MKEY) with a constant,
  applying to the first value (A1) a non-linear transformation, this transformation comprising the steps of:
    obtaining a second value (A2) by applying the first value (A1) to a substitution layer, the substitution layer comprising at least one substitution box (sbox), each substitution box containing at least one table of constants for which the input serves as the pointer and the pointed constant serves as the output,
    obtaining a third value (A3) by using a diffusion box of multi-permutation type based on the second value (A2),
    dividing the third value (A3) in N blocks of same size, obtaining the output fourth value (A4) formed by N blocks, each block of the fourth value (A4) being the result of the combination of N-1 blocks of the third value (A3), the missing block being the block of the same index,
    obtaining the seventh value (A7) by applying on the fourth value (A4) a substitution layer (sigma),
    obtaining the sub-key (RKEY) by applying to the seventh value (A7) a symmetrical encryption module (SENC), the first value (A1) serving as the key input for this module.

The method could be summarized as follows: a first level based on a linear diversification module and a second level based on a non-linear diversification module.

The linear diversification is achieved by mixing the main key with a pseudo-random value. One common method to produce this pseudo-random value is to take advantage of a LFSR function. This function is used to quickly generate values without the need to store a table of constants.

The LFSR is loaded with a first constant and shifted to produce a bit stream of the same length of the key length. This bit stream is then mixed (XOR) with the main key to produce the value A1.

The aim of the second level is to produce a non-linear diversification of the value A1.

This level comprises five main layers. The first one is a substitution layer.

The purpose of the substitution layer is to transform the input value to an output value without any simple algebraic relationship. The quickest way to achieve the expected confusion result is to use a lookup table containing constants.

Since in this embodiment the input data has a length of 32 bit, the number of constants will be $2^{32}$ values each of 32 bit length.

According to a preferred embodiment, the input data is split in groups of 8-bit length thus reducing the number of constants to 256 bytes.

Then the input data of 32 bit or 64 bit is divided in bytes of 8 bit and applied to the substitution box to obtain an output of 8 bit. The input data is used as address pointer and the pointed constant is the output.

Depending on the implementation method, the constant tables are the same for all groups of the input data (32 bit or 64 bit). In another embodiment, the constant tables are different for each group of the input data.

The constants stored in this table are a fixed permutation of numbers which are all different, encoded by a number of bits equal to the table width.

The second main layer of this non-linear level is the multi-permutation matrix. The multi-permutation matrix is a square matrix with property that every possible square sub-matrix has a determinant different of zero; the elements of the matrix are elements of a finite field. The mixing operation consists in multiplying a vector of input elements by the matrix, resulting in a vector which is defined to be the output.

The third layer is a mixing layer. The input value is divided into several blocks having the same size. For a given input block i, the output block i is the result of the XOR function of all input blocks except the block i.

The fourth layer is another substitution layer which apply the same operation to the input value as the first layer.

The fifth layer is a single encryption step of a multiple rounds encryption method. The input value is the result of the preceding layer and the key is taken from result of the linear diversification layer i.e. A1.

Various encryption methods could be applied such as DES, CAST or IDEA. The purpose of this layer is to ensure a good diversification i.e. to achieve a high diffusion of the input data.

In a particular embodiment of the invention, it is interesting to reuse the previous layers also for the encryption round. This is why instead of reusing a known encryption round, the following steps will be executed as encryption round on the input value A5 to obtain the output value RA:

- dividing the input value A5 into at least two values Y0L and Y0R,
- mixing the at least two values Y0L and Y0R to form a mixed value Y1,
- obtaining a value Y2 by mixing a first part A1H of the value A1 with the value Y1,
- obtaining a value Y3 by applying the value Y2 to a substitution layer, the substitution layer comprising at least one substitution box (sbox), each substitution box containing at least one table of constants for which the input serves as the pointer and the pointed constant serves as the output,
- obtaining a value Y4 by using a diffusion box of multipermutation type based on the value Y3,
- obtaining a value Y5 by mixing a second part A1L of the value A1 with the value Y4,
- obtaining a value Y6 by applying to the value Y5 a substitution layer,
- obtaining a value Y7 by mixing a first part RAH of the sub-key RA with the value Y6,
- mixing the value Y7 with the initial at least two values Y0L and Y0R to obtain at least two values Y8L and Y8R, Y8L and Y8R representing the output value RA of this encryption round.

According to another embodiment, an additional transformation is added on the value A4 before applying this value to the substitution layer.

This transformation is a mere addition with a constant, executed with an XOR function.

In case the provided key length is different that the size of the main key R, the current key should be firstly adjusted to have the same size than the main key.

In case the size of the current key is greater than the main key, the key is truncated and the remaining bits are added to the truncated part (XOR function).

In case the current key size is smaller than the main key, a padding will be added. In order to avoid that this padding will reduce the quality of the diversification, this padding is shuffled with the current key so that the padding bits are spread all along the resulting key.

The above characteristics allows to generate sub-keys having the following advantages:
- cryptographically safe
- generated in bidirectional, forward and backward mode
- using main key of variable length, preferably of 8 bits block.

BRIEF DESCRIPTION OF THE DRAWINGS

The FIG. 1 shows the block diagram of the generation of sub-keys based on the main key, The FIG. 2 shows the non-linear module based on a 128 bits input key and 64 bits output, The FIG. 3 shows the non-linear module based on a 256 bits input key and 64 bits output, The FIG. 4 shows the block diagram of the main module in the encryption process, The FIG. 5 shows the encryption process using two MOD modules and an orthomorphism function OR, The FIG. 6 shows the block diagram of the orthomorphism function, The FIG. 7 shows the internal part of the main encryption module MOD.

DETAILED DESCRIPTION OF THE INVENTION

Figure 1:
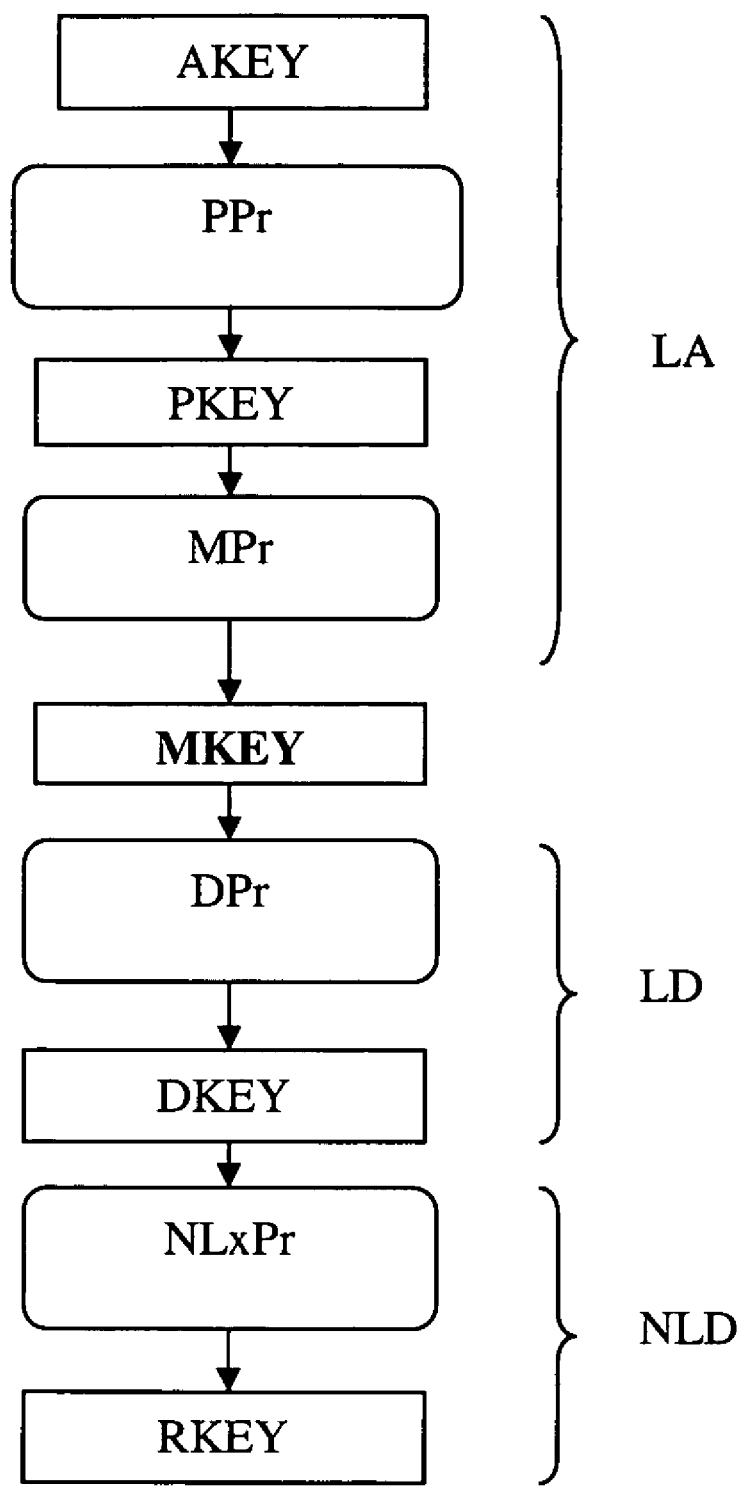

The FIG. 1 describes the main structure of this key generation. The first stage is the key length adjustment LA. The input key AKEY in this example has a smaller size than the expected size. The process PPr adds padding data in the input key AKEY so that the size will be the nominal size. This padding data is simply added at the end of the key. The resulting key PKEY has the nominal size, e.g. 128 or 256 bits.

The second process is the padding shuffling process MPr. It is important to mix the padding data within the key so that the padding data are not always at the same position. This mixing is made through a Fibonacci recursion, which takes as input a key PKEY with length ek (expressed in bits). More formally, the padded key PKEY is seen as an array of ek/8 bytes $PKEY_{I(8)}$, $0 \leq I \leq ek/8-1$, and is mixed according to:

$$MKEY_{i(8)} = PKEY_{i(8)} \oplus (MKEY_{i-1(8)} + MKEY_{i-2(8)} \mod 2^8) \; 0 \leq i \leq \frac{ek}{8} - 1$$

The next stage is the diversification stage LD which is the linear diversification part DPr. In case that the input key has already the expected size, this key will be directly loaded in the MKEY register.

The aim of this diversification part Dpr is to produce a linear diversification of the key MKEY by mixing the key MKEY with an initializing vector. For each sub-key generated, the initializing vector is different. Different embodiments could be used to produce this initializing vector.

The simplest way is to store an array of constants, each constant having the same size than the key size and acting as initializing vector. The number of initializing vectors is dependent of the number of rounds used for the encryption process or the number of sub-keys used by the system.

In a second embodiment, the initializing vectors are generated through a diversification part DPr which is based on a pseudo-random stream using a Linear Feedback Shift Register LFSR. An initial constant is loaded into the LFSR (24 bits in this example) and the output of this register, i.e. the initializing vector, is mixed with the key MKEY to produce the key DKEY.

This embodiment has the advantage to minimize the quantity of the data stored since the initializing vectors are not stored but are generated with the LFSR, only the initial constant is stored or is part of the algorithm.

In a third embodiment, the key itself is loaded in a LFSR and the LFSR output is directly the input of the next module i.e. the key DKEY.

The next stage, so called non-linear diversification stage NLD, is the non linear module NLxPR. This stage is described in details in the FIGS. 2 and 3.

Figure 2:
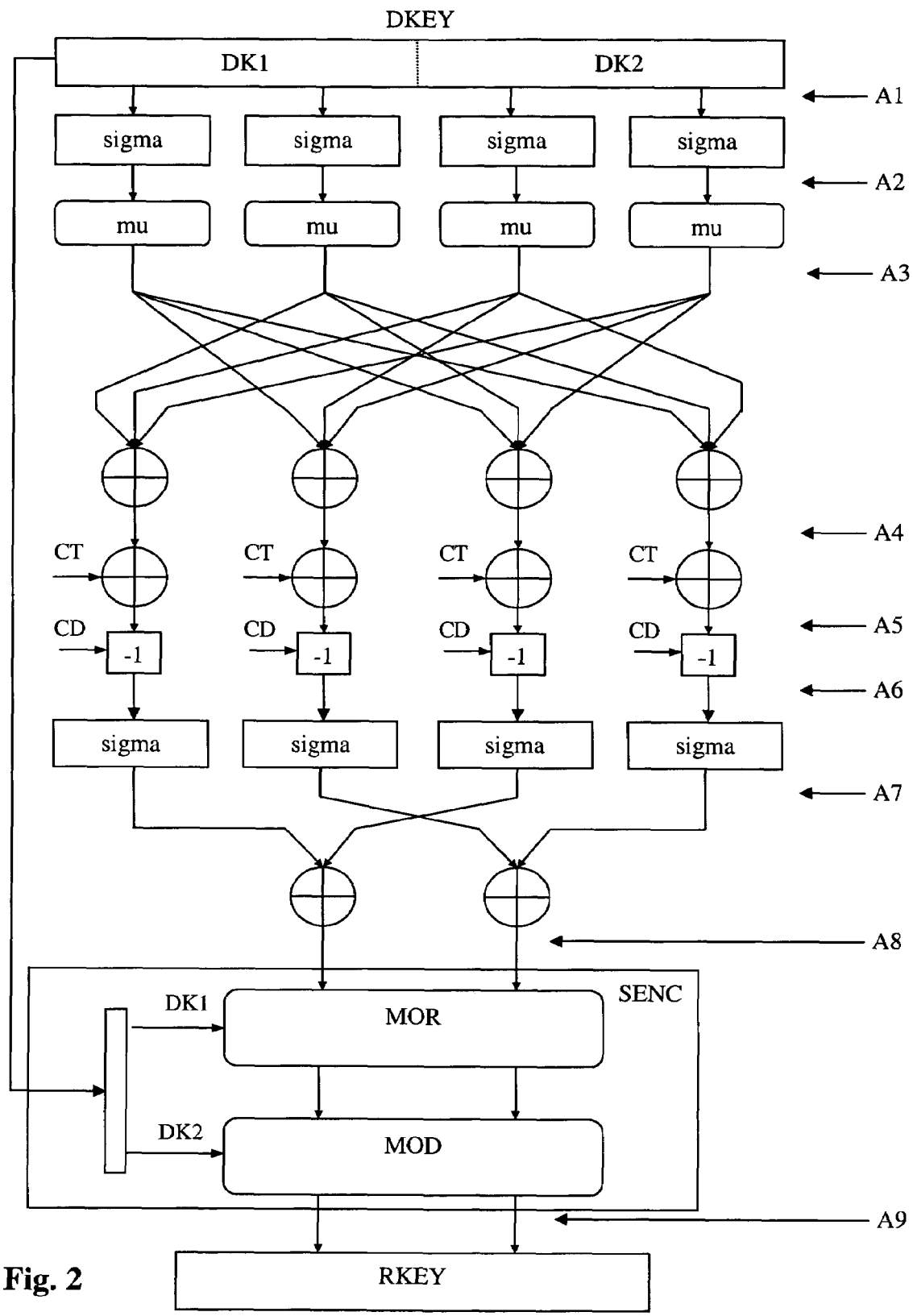

In the FIG. 2 the key DKEY (which corresponds with the value A1) is divided into four parts and applied to a substitution layer sigma, comprising at least one substitution box (sbox), each substitution box containing a table of constants for which the input serves as the pointer and the pointed constant serves as the output. The output data A2 is the output of the sigma box. One method to generate this constant table is to use a pseudorandom generator. When generating the table, one should remove all duplicate values so that each constant in this table is unique.

Depending on the implementation, the number of substitution box (sbox) can vary since each box in the present embodiment has 8-bit data input. The input data applied to the sigma module is split into parts of 8-bit length and applied to the substitution box. The output of each box is then concatenated to form the output of the module sigma.

The next stage is a matrix of multi-permutation type mu. This matrix in a diffusion box of (n,n) multi-permutation type. The input of one mu block is divided into n input vectors. For this example, we will choose a matrix of 4 elements. The diffusion box consists in multiplying the four input vectors (Aa, Ab, Ac, Ad) by a square matrix 4×4 Mu4, whose elements belong to the finite field with 256 elements; these elements are denoted Mu(i, j), where i refers to the row index and j to the column index. The result of the multiplication of the input vector (Aa, Ab, Ac, Ad) by the matrix Mu4 is a vector (Ya, Yb, Yc, Yd) where these values are obtained as follows:

$Ya=Mu4(1,1)*Aa+Mu4(1,2)*Ab+Mu4(1,3)*Ac+Mu4(1,4)*Ad$ $Yb=Mu4(2,1)*Aa+Mu4(2,2)*Ab+Mu4(2,3)*Ac+Mu4(2,4)*Ad$ $Yc=Mu4(3,1)*Aa+Mu4(3,2)*Ab+Mu4(3,3)*Ac+Mu4(3,4)*Ad$ $Yd=Mu4(4,1)*Aa+Mu4(4,2)*Ab+Mu4(4,3)*Ac+Mu4(4,4)*Ad$

Here "+" denotes the addition in the finite field and "*" its multiplication. The elements of Mu4 are chosen such that the amount of computations needed to evaluate the four above expressions is minimal. The number of multiplications by the constant "1" (thereafter denoted "identities") has therefore been chosen to be as large as possible.

The output value A3 of the mu block is the concatenation of the four output values Ya, Yb, Yc, Yd.

The next stage is a mixing step. It consists in dividing the value A3 in N blocks of same size, and obtaining the output value A4 formed by N blocks, each block of the value A4 being the result of the combination of N−1 blocks of the value A3, the missing block being the block of the same index.

In the example of the FIG. 2, the number of blocks is 4. The three remaining blocks are mixed together to form part of the value A4.

For example, as illustrated in FIG. 2, the number of blocks is 4. A3 is formed of 4 blocs, namely A3a, A3b, A3c, A3d. The output A4 is formed also of 4 blocks, namely A4a, A4b, A4c, A4d. As explained above, the output blocs are:

A4a=Combination of (A3b, A3c, A3d)
A4b=Combination of (A3a, A3c, A3d)
A4c=Combination of (A3a, A3b, A3d)
A4d=Combination of (A3a, A3b, A3c)

It is avoided to include the block of the same index in the combination to form the output block.

The next stage is an adder stage which adds a constant so that an unpredictable element is inserted in the process.

The resulting value A5 of the is applied to a conditional inverter, i.e. the inversion is enabled when padding data was added in the input key AKEY. When enabled, all bits of the value A5 are inverted to obtain the value A6. The inversion is made in case that padded data was added to the input key AKEY. The aim of this stage is to have a different behavior in case that a full size key is used and a padding key. A full size key can have theoretically the same value when a smaller key is inputted and padding data is added. When padding information is added to complete the input key to have the expected size, the inversion of the data A5 is made so that to introduce an additional diversification in the course of the generation process.

The resulting value A6 is then applied to a substitution layer sigma which is already described above.

The output value of the substitution layer A7 is reduced in size by half by mixing two elements This reduced value A8 is then applied to a symmetrical encryption module SENC in which the key is taken from the main input of the process (i.e. DKEY). As already stated, this module is basically a simple symmetrical encryption process. In the frame of this invention, instead of using a well known encryption process such as IDEA, DES . . . the encryption process is carried out using the process described in the patent application EP 03011696.6 of the same Applicant. This document is included in the present application by reference. The minimum number of rounds is determined so that the entire key DKEY is used. Since the key is longer than the input size of the encryption step, the key is divided and applied to different rounds serially connected.

This encryption process is described in reference with the FIGS. 4 to 7.

Figure 4:
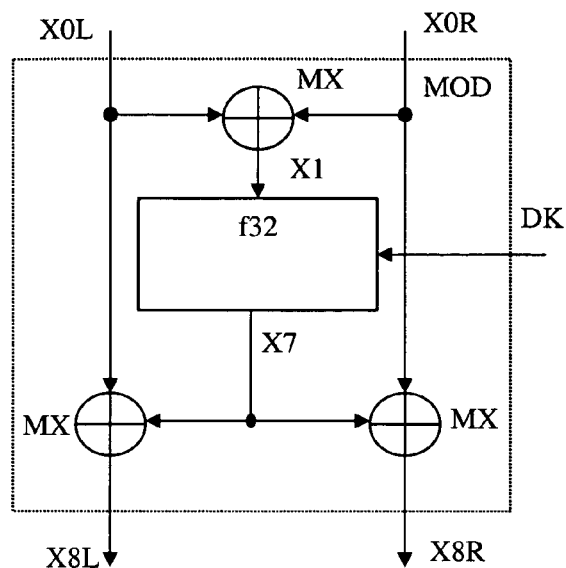

The FIG. 4 shows the skeleton of the encryption process which represents the module MOD. The entry data of 64 bit in the present example, represented in two parts X0L and X0R of 32 bit each, are firstly mixed within the mixing element MX to obtain the X1 value. This mixing element aims to provide a 32 bit image of two times 32 bits of data. This could be achieved in different ways such as using XOR function, addition with modulo, or by using any group operation.

The next step is illustrated with the block f32 which has a 32 bit input X1 and a 32 bits output X7 as well as using a sub-key DK. The detailed description of this block is given with reference to FIG. 7 (see below).

The output X7 of the block f32 is applied to the two mixing blocks MX which are connected with the two entries X0L and X0R.

The resulting data X8L and X8R represent the two 64 bits output X8 of the module MOD.

Figure 5:
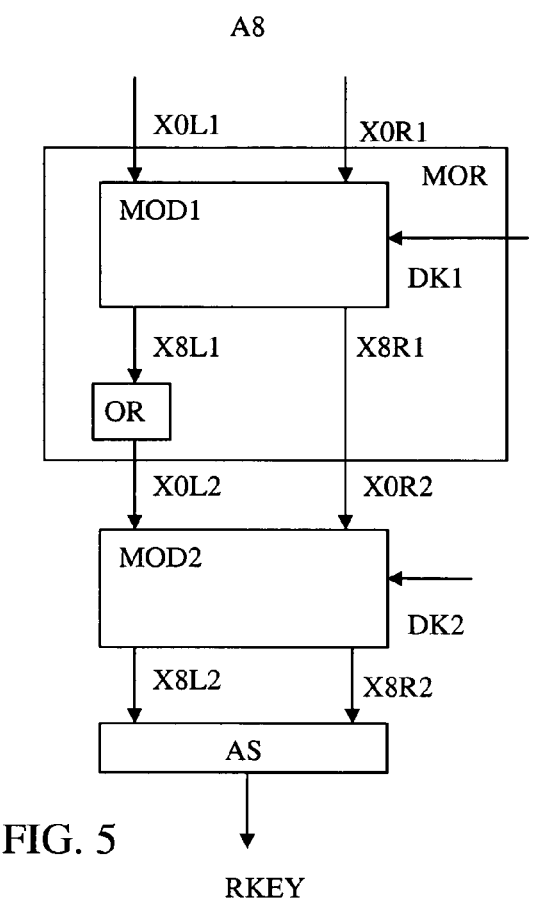

The FIG. 5 shows the whole encryption process using two identical modules MOD, i.e. MOD1 and MOD2. The input data A8 is formed by two parts X0L1 and X0R1, each of 32-bit length.

The symmetrical encryption process is referenced SENC in the FIG. 2. This module corresponds with the block diagram of the FIG. 5.

The outputs X0L1 and X0R1 are then used as entries in the first module MOD1. This first module processes the data while using a first sub-key DK1. DK1 is a part of the main key DKEY. The processing for X0L1 and X0R1 is the same as described according to FIG. 4. The outputs of this first module MOD1 are two outputs X8L1 and X8R1. An orthomorphism function is applied to one of these outputs, for example X8L1 as illustrated on FIG. 5. The output resulting from this orthomorphism function is referenced as X0L2. The other value X8R1 resulting from the processing by the first module MOD1 is used as input, as well as the output X0L2 resulting from the orthomorphism function, in a second processing module MOD2. The module MOR is the result of a module MOD with an orthomorphism function OR in one of the output of this module.

This second module MOD2 will process their input data based on a second part DK2 of the main key DKEY. The outputs of this second module are referenced as X8L2 and X8R2 on FIG. 4. These outputs are assembled to form the sub-key RKEY within the assembler module AS.

The function of this assembler module AS could be achieved in different ways such as selecting the lowest bits for X8L2 and the highest bits for X8R2, or every odd bit for X8L2 and even bit for X8R2. Other methods of assembling the resulting data RKEY could be used as long as all the bits of RKEY are comprised in X8L2 and X8R2.

Figure 7:
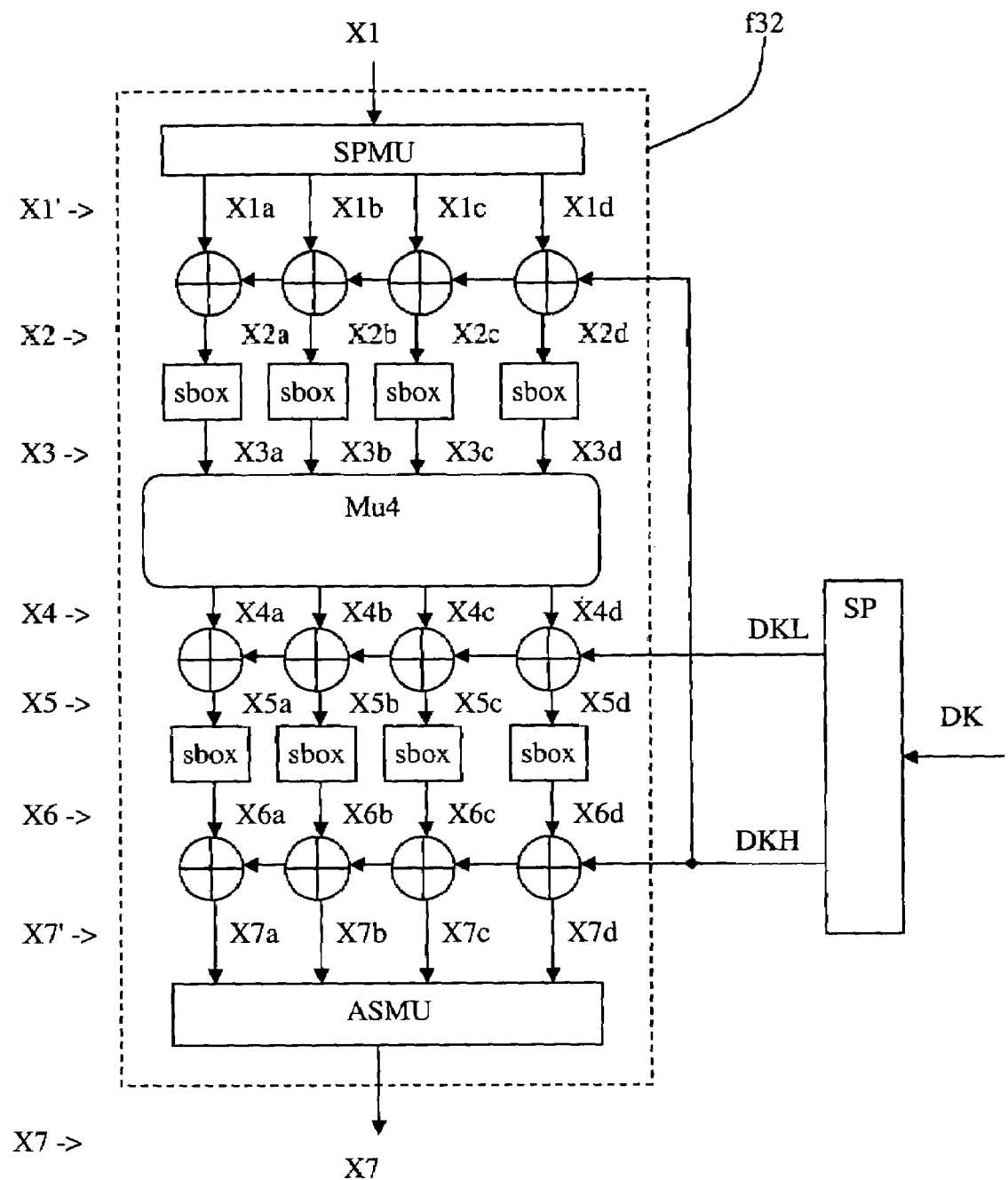

The FIG. 7 shows in detail, the functions of the block f32 of the FIG. 4. In this block, a 32-bits length data X1 is the input. This data are separated in blocks of 8-bit length (X1a, X1b, X1c, X1d) through a splitting block SPMU, also mentioned X1' in the FIG. 7.

This block has the function to split the input data X1 so that all bits of the resulting value X1a, X1b, X1c and X1d are present in X1. These four values are mixed with the highest value DKH of the key DK, which could be DK1 or DK2 depending on the module concerned (MOR or MOD) to form the four values X2a, X2b, X2c and X2d.

The generation of the two sub-keys DKL and DKH is made through the splitting module SP.

Each of these values X2a to X2d are applied to a substitution layer, comprising at least one substitution box (sbox), each substitution box containing a table of constants for which the input serves as the pointer and the pointed constant serves as the output. The output data is referenced as X3a, X3b, X3c, X3d (forming the value X3) on FIG. 7.

This substitution layer was already described in reference with the FIG. 2 while describing the module sigma. The resulting value is X3.

The same apply for the Mu4 module which correspond to the mu module of the FIG. 2. The resulting value is X4.

The output data X4 of data is then mixed with a second part DKL of the sub-key DK to obtain a value X5a, X5b, X5c, X5d (forming the value X5).

Each of these values X5a to X5d is then applied to a substitution block (sbox) to obtain a value X6a, X6b, X6c, X6d (forming the value X6). These values are mixed with a first part DKH of the sub-key DK to obtain new values X7a, X7b, X7c, X7d (forming the value X7).

Then these values X7a, X7b, X7c, X7d are assembled to form the output data X7 within the assembler module AS as described in respect with the FIG. 5. This data corresponds to the output data X7 of block f32 in FIG. 4

Figure 6:
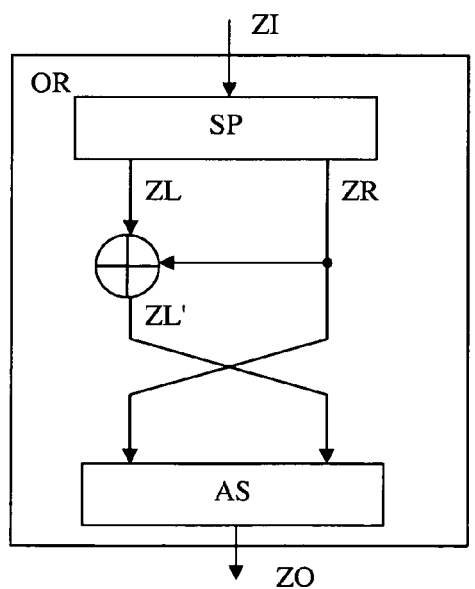

The FIG. 6 is an illustration of an embodiment of the orthomorphism function. The input data is noted ZI and the output data is noted ZO. The data length is not an issue for this function. The input data ZI is first divided into two values ZL and ZR of the same size with the splitting module SP. Then the two values are mixed with the so called MX mixing element and the output of the element is applied to the assembler unit AS. The other split value ZR is directly applied to the assembler module AS without modification. This module comprises two inputs and combines these data to form the output value ZO. This module works inversely than the splitting module SP. The particularity of this embodiment is that the inputs of the assembler module are crossed relative to the outputs of the splitting module SP. The right output ZR of the splitting module SP is applied to the left input of the assembler module AS and the left output ZL of the splitting module SP, after being mixed with the other output of the splitting module SP, is applied to the right input of the assembler module AS.

Figure 3:
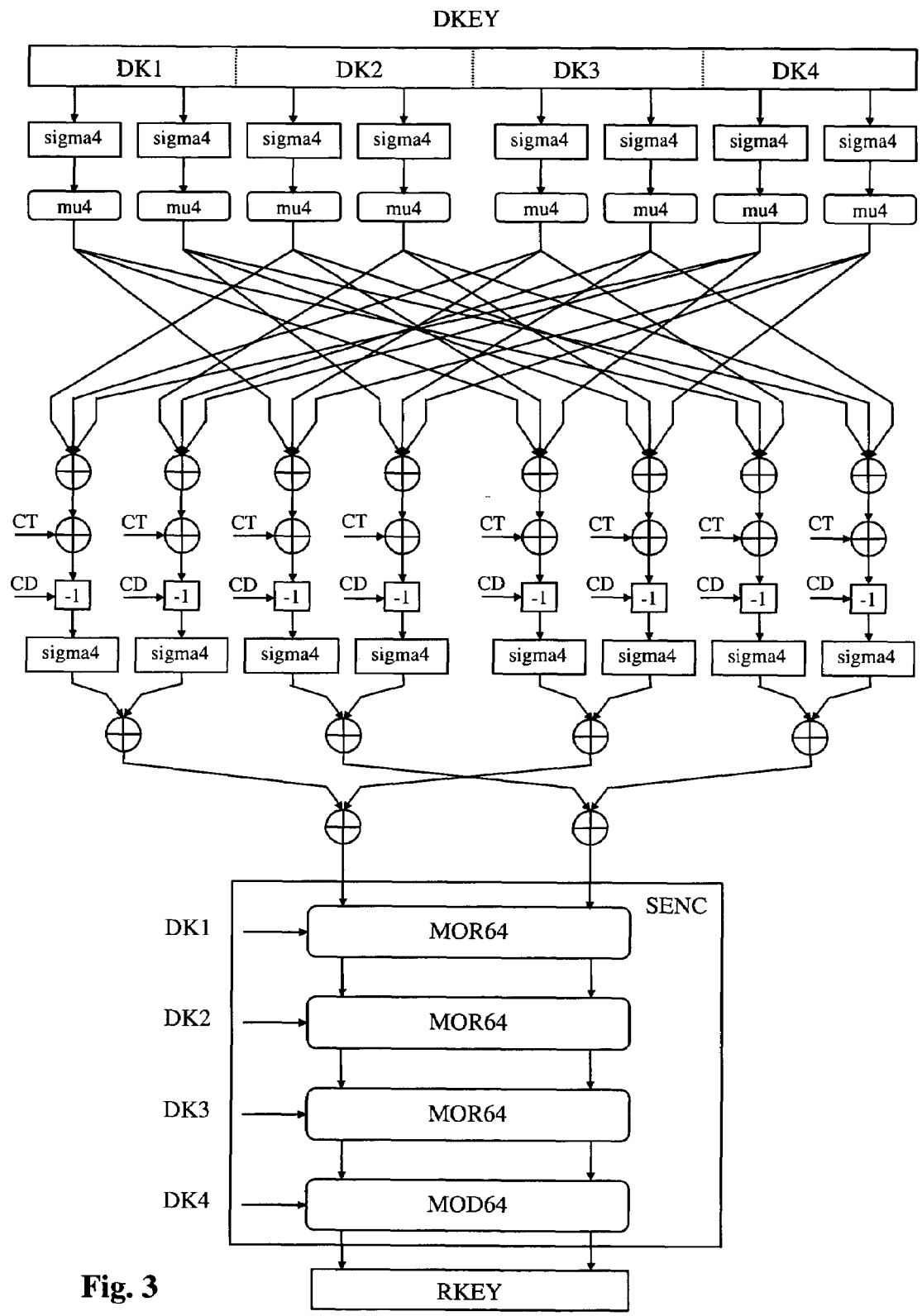

The FIG. 3 is another embodiment to produce a sub-key RKEY based on a main key DKEY. While faced with modules which can only process a data of limited size, in case that longer keys are processed, it is necessary to divide the input key DKEY in more elements and handle them in parallel. The principle described with respect of the FIG. 2 remains the same with one exception while forming the value A4. For simplification purposes, the number of elements mixed together from the value A3 is limited to three.

At the stage of the symmetrical encryption process SENC, the input key DKEY is divided in four parts and applied to three independent encryption modules MOR64, these modules having an orthomorphism function applied to the half of the resulting value The last module MOD64 is a one round encryption process without the orthomorphism function.

From the value A8 to RKEY, the encryption process is carried out in four rounds, each round using one part of the input key DKEY. The first three rounds are using a module MOR i.e. having an orthomorphism function in one of the output of the MOD module and the last round is of the type MOD, i.e. without orthomorphism function.

One important point is to generate the sub-keys in the reverse order. This particularity is useful when the sub-keys are used in an multiple rounds encryption process.

This is achieved at the stage of the linear diversification part DPr. The set of initializing vectors used to mix with the key MKEY is applied in the reverse order. When the initializing vectors are produced with a LFSR, the register is clocked in the reverse order (backward process) and the initial value loaded in the register is the end value representing the last initializing vector used during the forward process.

The invention claimed is:

1. A method to generate a sub-key based on a main key, comprising the following steps:
    obtaining a first value by applying to the main key a linear diversification layer by mixing the main key with a constant,
    applying to the first value a non-linear transformation, this transformation comprising:
        obtaining a second value by applying the first value to a substitution layer, the substitution layer comprising at least one substitution box (sbox), each substitution box containing at least one table of constants for which the first value serves as a pointer and a pointed constant serves as an output,
        obtaining a third value by using a diffusion box of multi-permutation type based on the second value,
        dividing the third value in N blocks of same size, obtaining an output fourth value formed by N blocks, each block of the fourth value being the result of the combination of at least two blocks of the third value, a block having a same index being always omitted,
        obtaining a seventh value by applying to the fourth value a substitution layer (sigma),
        obtaining the sub-key by applying to the seventh value of a symmetrical encryption module, the first value serving as a key input for this module.

2. The method of claim 1, wherein a provided key is of smaller size than the main key, this method consisting in obtaining the main key from the provided key according to the followings steps: adding padding data in order to make the provided key the same size of the main key, mixing the padding data with the provided key so that padding bits are spread all along resulting key.

3. The method of claim 1, wherein the constant mixed with the main key to obtain the first value is pseudo-randomly generated using a LFSR loaded with a first constant.

4. The method of claim 1, wherein for a size of the input of the symmetrical encryption module smaller than the size of the seventh value, the method further comprises the step of reducing the seventh value at least by half by mixing at least two elements of the seventh value to obtain a result, the result being the size of the input of the symmetrical encryption module.

5. The method of claim 1, wherein a constant is added on the fourth value before applying to the substitution layer (sigma).

6. The method of claim 2, wherein an inversion is made on all bits of input value of the substitution layer (sigma) while padding data is added on the provided key.

* * * * *